March 14, 1933.  W. J. DELLES  1,901,704

METHOD OF MANUFACTURING BLADE RING STRUCTURES

Filed Aug. 12, 1929

Inventor:
William J. Delles,
by Charles E. Fuller
His Attorney.

Patented Mar. 14, 1933

1,901,704

UNITED STATES PATENT OFFICE

WILLIAM J. DELLES, OF SCHENECTADY, NEW YORK, ASSIGNOR TO GENERAL ELECTRIC COMPANY, A CORPORATION OF NEW YORK

METHOD OF MANUFACTURING BLADE RING STRUCTURES

Application filed August 12, 1929. Serial No. 385,296.

The present invention relates to blade ring structures such as are used in elastic fluid turbines, for example, for directing the flow of elastic fluid, and has for its object to provide an improved method of manufacturing such structures. The improved method is well adapted for use in the manufacture of nozzle rings for elastic fluid turbines and in the following specification it is specifically disclosed as applied to this use. It is to be understood, however, that the invention is not limited necessarily to this particular application. Also it is to be understood that as to certain aspects the invention is not limited necessarily to the manufacture of blade ring structures.

For a consideration of what I believe to be novel and my invention, attention is directed to the following specification and claims appended thereto.

Figure 1:
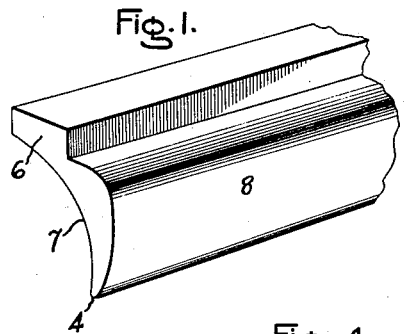
Figure 2:
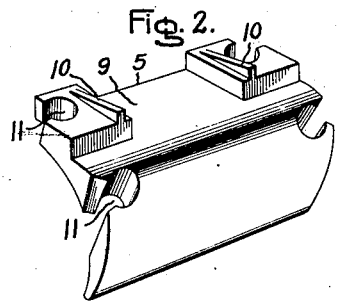
Figure 3:
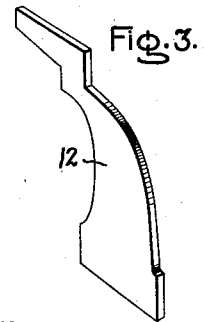
Figure 4:
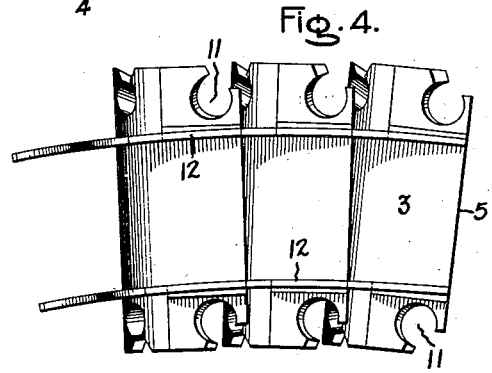
Figure 5:
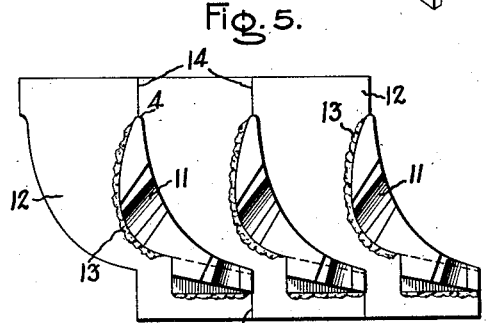
Figure 6:
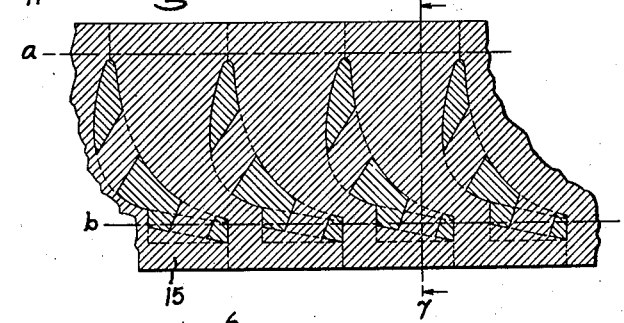
Figure 7:
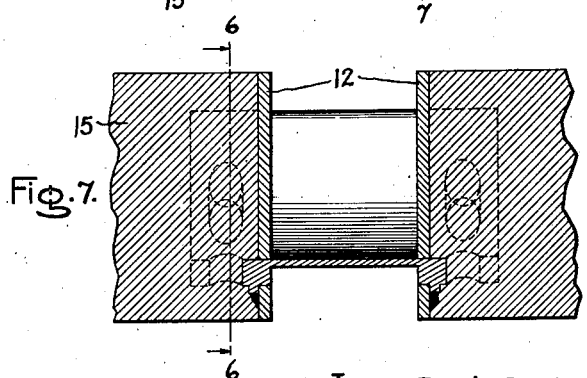

In the drawing, Figure 1 is a perspective view of bar material which may be used in carrying out my invention; Figure 2 is a perspective view of a partially completed partition member or blade formed from material such as that shown in Figure 1; Figure 3 is a perspective view of a spacer; Figure 4 is a side view showing the manner in which the partition members of Figure 2 and the spacers of Figure 3 are assembled to form a ring structure; Figure 5 is an end view of the structure shown in Figure 4, the parts being indicated in Figure 5 as being welded together; Figure 6 is a sectional view taken on line 6—6, Fig. 7, of a portion of the nozzle ring after the inner and outer rings have been cast thereon; Figure 7 is a sectional view taken on line 7—7, Fig. 6, and Figure 8 is a perspective view showing one-half of a completed nozzle ring.

Figure 8:
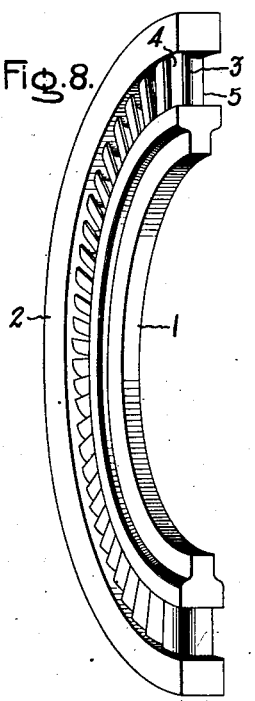

Referring first to Figure 8, the structure which is to be built comprises an inner ring 1 and an outer ring 2 separated by fluid directing blades or nozzle partitions 3, the blades or nozzle partitions having a rounded entrance edge 4 and a sharp discharge edge 5. In Figure 8 one-half of the nozzle ring is shown but it is to be understood that the other half is of similar structure. It is the practice in the manufacture of elastic fluid turbines to form the diaphragms and the nozzle rings in upper and lower halves.

According to my invention, I provide bars of suitable length which are shaped to the desired contour of the partition members except that at the discharge edge instead of being sharp, as indicated at 5 in Figure 8, they are thickened as is indicated at 6. In Figure 1, 4 indicates the rounded entrance edge, 7 indicates the face of the partition member and 8 indicates the back of the partition member. From bars as shown in Figure 1 are cut partition members of the desired length and such partition members are then finished as is shown in Figure 2, the thickened portion 6 being cut away as is indicated at 9 to form throughout the active length of the partition member the sharpened discharge edge 5. This leaves thickened portions at the ends of the blades or partition members which serve to reinforce what would otherwise be a thin edge. On these end thickened portions are formed projecting lugs 10, and in the ends of the members are formed holes 11.

For use with the blades or partition members, I provide spacers 12 as shown in Fig. 3, the spacers being shaped to conform to the contour of the partition members and being finished on both sides. These spacers may be stamped from sheet material of suitable thickness.

In constructing a nozzle ring, partition members as shown in Fig. 2 are assembled in spaced relation to each other with spacers 12 between them as is shown in Figs. 4 and 5 and the assembled structure welded together in a temporary or initial manner as is indicated at 13 in Fig. 5. The spacers are positioned by engagement with lugs 10 which are spaced from the inner edges of the thickened portions by an amount equal to the thickness of the spacers so that the spacers are flush with the thickened portions. The spacers entirely surround the partition members as best shown in Fig. 5, adjacent spacers being in contact with each other as is indicated at 14.

The assembled structure is then placed in a mold and metal to form inner and outer rings 1 and 2 is cast around the ends of the partition members as is shown at 15 in Figs. 6 and 7. It will be seen that the cast metal is located outside the spacers 12 and that it enters the openings 11 so as to make a strong bond with the ends of the partition members. The structure is then machined to its finished form as shown in Fig. 8. In being machined, the structure is cut down along the side edges as is indicated by the dot and dash lines a and b in Fig. 6 and it will be seen that the line b cuts across the thickened end portions 6 removing a part of this metal, this being necessary in order to bring this side face about flush with the discharge edges 5. The purpose of the thickened end portions is to provide additional metal at and to reinforce the thin discharge edges of the partition members so that when the molten metal is cast around the ends, the thin edges will not be destroyed and a good bond will be obtained. I consider this to be one important feature of my invention for were it not for these thickened ends to reinforce what would otherwise be thin edges, a washing away of the thin edges would occur during the casting operation and poor union between the cast metal and the thin edges would result. This washing away occurs because during the pouring operation, the molten metal must flow across and around the ends of the partition members, and being at a temperature higher than the melting temperature of the partition members, it will effect washing or melting away of thin edges. When melting or washing away of the edges occurs, a good bond is not effected because the parts do not fuse together.

By the use of the thickened edges there is obtained a strong bond between the thin edges of the blades or partition members which is capable of carrying the required load.

In the completed structure, the spacers 12 form the inner and outer walls of the passages between the partition members which means that a smooth surface wall is obtained without machining.

What I claim as new and desire to secure by Letters Patent of the United States is:

1. The method of manufacturing blade ring structures which comprises assembling partition members having thickened ends with spacers between them, the thickened ends extending beyond the spacers, casting metal around the thickened ends, and then machining the cast ends to the desired dimensions.

2. The method of manufacturing blade ring structures comprising thin edged partition members located between rings, which comprises providing partition members having at their ends reinforcing metal for the thin edges, assembling the partition members with spacers between them, the ends of the members projecting beyond the spacers, casting metal around said projecting ends, and then machining the cast ends to the desired dimensions.

3. The method of manufacturing blade ring structures comprising thin edged partition members located between rings, which comprises providing partition members having at their ends reinforcing metal for the thin edges, assembling the partition members with spacers between them, the ends of the members projecting beyond the spacers initially welding the members and spacers together, casting metal around said projecting ends, and then machining the cast ends to the desired dimensions.

4. The method of forming a ring structure having spaced thin edged partition members located between rings which comprises providing re-inforcing metal adjacent the thin edges of said partition member, assembling said members in predetermined spaced relation, casting metal around said re-inforced ends and then machining the cast ends to the desired dimensions.

5. The method of manufacturing a ring structure which comprises assembling thin edged members having thickened ends with spacer between them, the thickened ends extending beyond the spacers, casting metal around the thickened ends, and then machining the cast ends to the desired dimensions.

In witness whereof, I have hereunto set my hand this 10th day of August, 1929.

WILLIAM J. DELLES.